United States Patent [19]

Bredow

[11] 4,250,784
[45] Feb. 17, 1981

[54] PRESS FOR PUNCHING AND CUTTING PLATE-SHAPED WORKPIECES, ESPECIALLY SHEET METAL WORKPIECES

[75] Inventor: Walter Bredow, Alfeld, Fed. Rep. of Germany

[73] Assignee: C. Behrens AG, Alfred, Fed. Rep. of Germany

[21] Appl. No.: 964,735

[22] Filed: Nov. 29, 1978

[51] Int. Cl.³ .............................................. B26D 9/00
[52] U.S. Cl. ...................................... 83/518; 83/519; 83/549; 83/552
[58] Field of Search .................. 83/518, 549, 552, 519

[56] References Cited

U.S. PATENT DOCUMENTS

| 174,782 | 3/1876 | Colton et al. | 83/549 |
| 1,389,880 | 9/1921 | Kraut | 83/518 |
| 3,165,962 | 1/1965 | Bredow | 83/552 |

Primary Examiner—Donald R. Schran
Attorney, Agent, or Firm—Michael J. Striker

[57] ABSTRACT

A combined press for punching and cutting respectively trimming a plate-shaped workpiece comprises at least one punching tool including a punch reciprocable along an axis and a first dirve for reciprocating said punch, at least one cutting tool including a knife reciprocatably parallel to the punch and a second drive for reciprocating the knife, a main drive, and a transmission arrangement connected at one end to the main drive and selectively connectable to said first and second drive for reciprocating either said punch or said cutting knife.

16 Claims, 9 Drawing Figures

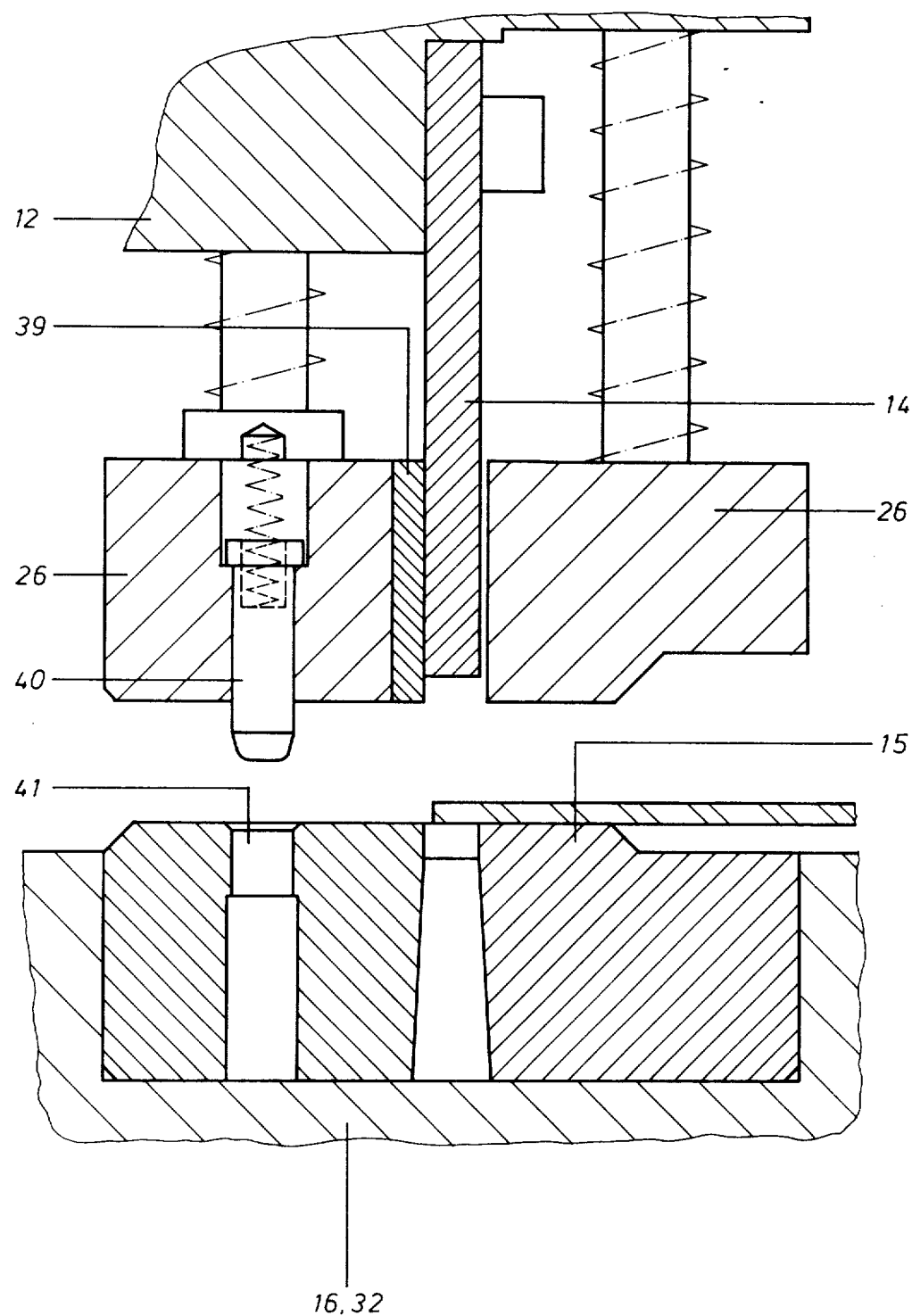

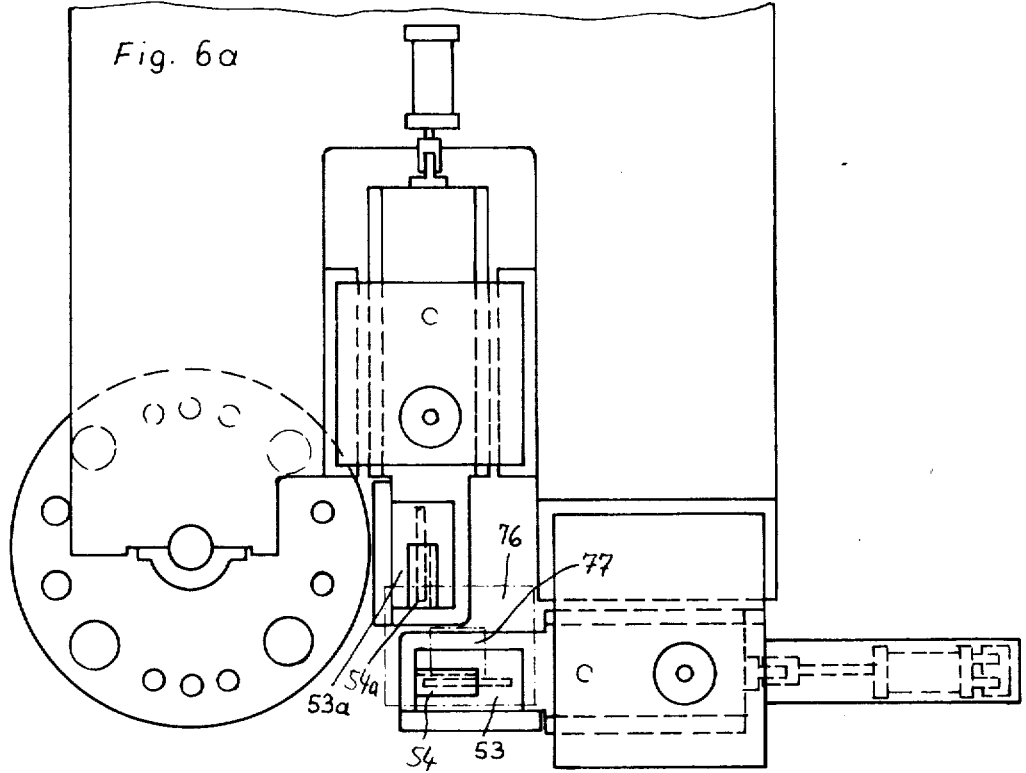
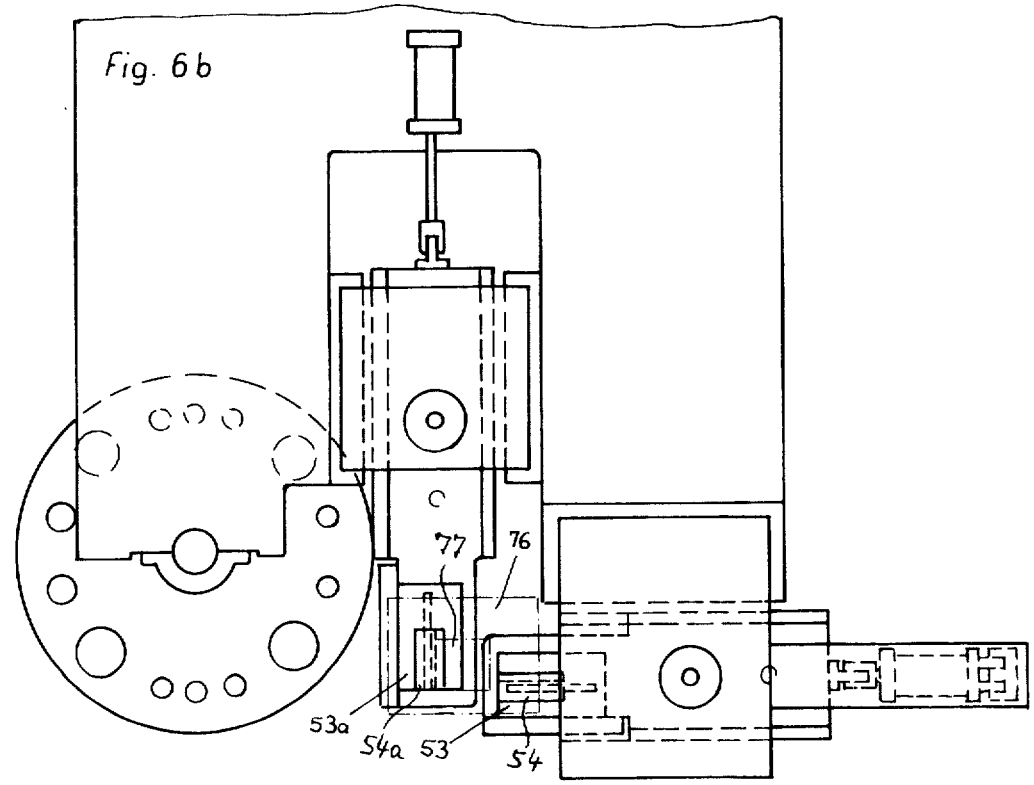

PRESS FOR PUNCHING AND CUTTING PLATE-SHAPED WORKPIECES, ESPECIALLY SHEET METAL WORKPIECES

BACKGROUND OF THE INVENTION

The present invention relates to a press for punching and cutting, respectively trimming, plate-shaped workpieces, especially sheet metal workpieces.

For the production of planar metal sheet parts in small series as required for instance in the electro-industry or for the construction of apparatus and similar fields of technical endeavor, numerically controlled turret punching presses or punching presses with only one punching tool are used since long time. If the sheet metal parts are relatively small, a plurality thereof are often combined to a large sheet and punched in such a manner that the programming expenditure is reduced and the output increased. This working procedure has, however, the disadvantage that, after the punching, the large sheet has to be subdivided into the corresponding punched sheet metal parts. For this purpose there are two possibilities:

1. The large sheet is subdivided in hammer shears.

This method is, however, difficult to carry out when, as is quite often the case, special requirements with respect to the exactness of the sheet metal parts are requested. First of all, it is already difficult to produce exactly parallel cuts and to produce cuts which are normal to each other and further to locate the prior punched hole or holes exactly in proper position to the outer contour of the thus-produced metal sheet parts.

2. It is also possible to separate the parts on the turret punch press subsequent to the punching of the metal sheet. For this purpose separating tools in form of small rectangular punches are used. Disadvantageous in such construction is that only relatively small separating tools may be used and in addition two stations of the turret press are necessary for the required cuts in two directions normal to each other.

In order to avoid the above-mentioned difficulties there is also a machine on the market which is in the form of a numerically controlled cutting press in which in one stroke a cut in two directions normal to each other may be produced. This cutting press is provided with a coordinate table for feeding the sheet metal to the cutting knives. This cutting press has the advantage, as compared to the above-mentioned hammer shears, that it will work with greater precision and this press will also operate considerably faster as in a process in which the cutting is carried out on the turret punch press, since considerably longer cutting knives may be used. However, this machine is fully separated from the punching press and furthermore this machine is relatively expensive. With regard to the total production process of the above-mentioned sheet metal parts there exists in all above-mentioned machines the disadvantage that the sheets which are punched in a punch press, especially a turret punch press, must be removed from this press and then transported to the respectively used cutting machine to be reclamped therein and to be subsequently cut into individual sheet metal parts or trimmed. This procedure requires, on the one hand, the additional expenditure for a separate machine, which is especially disadvantageous in the production of small series of metal sheet parts, and on the other hand, it increases considerably the necessary expenditure of labor and time, while still causing some problems as to the exactness of the produced metal sheet part since the same have to be clamped, properly oriented, in two different machines.

SUMMARY OF THE INVENTION

It is an object of the present invention to provide a press in which sheet metal parts may be punched and cut with a minimum of expenditure of labor and time and with an optimal exactness.

With these and other objects in view, which will become apparent as the description proceeds, the present invention relates to a press for punching and cutting plate-shaped workpieces, especially workpieces of sheet metal, and mainly comprising support means, at least one punching tool means mounted on said support means and including a punch reciprocable along an axis, first means operatively connected to the punch for reciprocating the same along the axis thereof, cutting tool means mounted on the support means and including at least one knife reciprocatable in a plane parallel to said axis, second means operatively connected to said at least one knife for reciprocating the same in said plane, main drive means, and transmission means connected to said main drive means and selectively connectable to said first and second moving means to reciprocate either said punch or said cutting knife.

Therefore, according to the present invention the two, up-to-now separated machines for punching and cutting of sheet metal workpieces are combined into a single unit so that the above-mentioned expenditures for two separate machines and transport of the workpiece from one to the other and the therewith connected labor and time are eliminated. Furthermore, the elements first punched in the press are directly separated from each other by cutting tools provided in the same press, whereby the main drive means are coupled over the coupling members with respective reciprocating means, so that the cutting process can be carried out under maintaining of the exact positioning of the workpiece and with the most possible exactness. This is especially advantageous when the press is provided with a coordinate table since the positioning and control thereof, after coupling of the reciprocating means of the cutting tool during the following cutting process, may be continued with the same exactness. On one machine, especially on a turret punch press, it is, therefore, possible to provide the sheet metal with the desired openings and to subsequently thereto cut or trim the sheet metal while likewise exact positioning and controlling the same. The machine unit according to the present invention can be held simple in its construction. It is only necessary to enlarge the support or machine frame, especially the usually employed inner C-shaped body of the machine frame, in which the additional reciprocating means and elements of the cutting tool means are mounted and guided. The eventually provided locating and control means, especially a coordinate table, may be properly constructed and used also for the cutting tool means.

According to a preferred construction, each of the first and second reciprocating means comprises a plunger guided in the support means and eccentric drive means connected to one end of the plunger, while the punch and the knife of the punching tool means and the cutting means are connected to the other end of the respective plunger, and wherein the aforementioned transmission means comprise a cardan shaft connected at one end to the main drive means and a coupling shaft connected to the other end of the cardan shaft and including means coordinated with the coupling shaft for moving the latter selectively between two positions for respectively coupling the coupling shaft to the eccentric drive means of either the first or the second reciprocating means. In this way the cardan shaft in connection with the coupling shaft may be used for reciprocating either the punch of the punching tool means or the knife of the cutting tool means.

The means cooperating with the coupling shaft for moving the latter selectively between the above-mentioned two positions, preferably comprise a carrier carrying the coupling shaft, guide means for guiding the carrier along a predetermined path, preferably extending transverse to the longitudinal direction of the press, and means for moving the carrier along said guide means so as to selectively place said coupling shaft into either of its two positions for coupling the same with the eccentric drive means of either the first or the second reciprocating means. The means for moving the carrier along the above-mentioned predetermined path preferably comprise fluid-operated cylinder-and-piston means. This leads to an extremely simple construction for selectably moving the coupling shaft to two positions in which it may be coupled to either the first or the second reciprocating means.

The present invention relates also to an especially advantageous construction of the cutting tool means of the press. During the above-mentioned cutting process it is quite often necessary to cut the workpiece at different angles, especially along two edges which are perpendicular to each other. It is, therefore, also an object of the present invention to provide cutting tool means by means of which the workpiece may be cut at different angles and especially in such machines which cooperate with a coordinate table in order to utilize the latter also in the best manner in connection with the turret punching tool means.

This additional object is obtained in accordance with one embodiment of the present invention in which the cutting tool means comprise an upper cutting knife connected to the other end of the respective plunger turnable about the axis thereof and at least one lower cutting knife and means mounting the lower cutting knife in the support means turnable about the above-mentioned axis. This embodiment includes also means for arresting the upper cutting knife and the mounting means for the lower cutting knife in a plurality of turned positions in which the upper cutting knife and the mounting means for the lower cutting knife are turned through equal angles from a starting position.

In the above-described prior art an angular shear has also been mentioned. The disadvantage of such angular shears is that especially workpieces of sheet metal which project beyond the lower knife of the angular shear may not be properly supported, so that the portion projecting beyond the lower knife at least partly sags downwardly, which leads to the above-mentioned inexactness of the cut.

An especially advantageous further characteristic of the cutting tool means according to the present invention, by means of which the above-described disadvantages of a missing support of the sheet metal workpiece is obviated, is characterized in that the upper cutting knife is constructed as a slitting knife having a pair of parallel cutting edges and in which a tool holder is connected at one end to the respective end of the respective plunger turnable about the axis of the latter to be reciprocated along this axis, in which the tool holder carries the slitting knife at the other end thereof and a pair of pressure pads to opposite sides of the slitting knife, wherein the lower cutting knife is constituted by a die having a pair of parallel cutting edges arranged for cooperation with the cutting edges of the slitting knife and means mounting the die in the support means turnable about said axis, and including arresting means cooperating with the tool holder and the mounting means of the die for arresting the tool holder and the mounting means in a plurality of turned positions in which the cutting edges of the slitting knife are substantially aligned with the cutting edges of the die. This arrangement preferably also includes means cooperating with the tool holder of the slitting knife and the mounting means of the die for turning the slitting knife and the die through equal angles from a starting position. In this construction a sagging of the sheet metal workpiece and corresponding distortion of sheet metal parts to be cut is completely avoided since the sheet metal is properly supported to both sides of the slitting knife.

This arrangement may include a guide bushing mounted in the support means turnable about its axis and carrying said tool holder for the slitting knife for turning movement therewith and for reciprocation along the above-mentioned axis and the above-mentioned turning means may in this case be connected to the guide bushing and the mounting means of the die for turning the guide bushing and the mounting means through equal angles about the aforementioned axis.

The turning means may comprise a pair of annular gears respectively coaxially fixed to the guide bushing and the mounting means, a pair of racks respectively meshing with said pair of annular gears, and means connected to the pair of racks for moving the same through equal distances.

The arresting means may comprise a pair of arresting bolts respectively coordinated with said guide bushing and the mounting means of the die, a plurality of circumferentially spaced arresting bores in the guide bushing and the die, and means connected to the arresting bolts for moving the same between an inactive position and an arresting position engaged in a respective arresting bore. The means for moving the arresting bolt between the positions thereof may be mechanically, electrically or fluid-operated. By providing corresponding safety means, especially electrically operated safety means, it is possible to assure in a simple manner that the cutting operation can be initiated only when the slitting knife and the die are in the same angular position.

During the production of elements from sheet metal it is often required that these elements are trimmed at the outer edges thereof. If not sufficient material is available for trimming, difficulties may arise if the edge strip to be separated is smaller than the slitting knife. In this case it is possible that laterally acting forces press the slitting knife in lateral direction so that the latter engages the die on the side thereof opposite the cut. In order to positively avoid such a disadvantage, a further feature of the present invention consists in that a slitting knife guide is carried by at least one of the pressure pads at the sides thereof facing the slitting knife and that the pressure pads carries, at the sides thereof facing the slitting knife, at least two pilot pins, spaced in the direction of the plane of the slitting knife, and projecting towards the die, and in which corresponding pilot bores are provided in the die for receiving the pilot pin during reciprocation of the slitting knife and the pressure pad with the pilot pins. In this arrangement means may also be provided for yieldably biasing the pilot pins to project beyond that face of the pressure pad which is directed towards the die. In this construction the slitting knife guide will prevent the lateral movement of the slitting knife at the above-mentioned disadvantageous loading thereof, whereby the pilot pins during the cutting operation have already entered the pilot bores in the die when the slitting knife starts on its cutting operation.

While in the above-described embodiment the upper knife and the lower die of the cutting tool means are arranged turnable about a common axis, it has been ascertained that this turnability of the elements of the cutting tool means is not essential in all applications. It is, therefore, also an object of the present invention to provide a punching and cutting press in which the cutting tools of the press are arranged in a simple manner so that they can be easily automatically controlled, whereby the adjustability of the tools of the cutting tool means is carried out in such a manner that they can be in a simple way adapted to the usually employed coordinate control and closely adjacent to the punching tools of the press, especially to a punching tool arranged on a turntable of a turret punch press.

With these additional objects in mind, the press according to the present invention includes two cutting tool means mounted on the support means of the machine frame of the press, each including an upper cutting knife and a lower die arranged for cooperation with the respective upper cutting knife, in which the two cutting tool means are movable relative to each other in a plane normal to the direction of reciprocation of the upper cutting knife and selectively in two directions which are normal to each other between a rest position and a working position and the above-mentioned second reciprocating means are constructed in this case for coupling the upper cutting knife of each of the cutting tool means in its working position for reciprocation therewith.

In this way a simple translatory movement for the upper cutting knives and the lower dies is assured. An additional advantage is derived thereof that the distance of the reciprocating means, that is the drive means for the cutting tool means from the punching tool can be held especially small, so that short movements of the workpiece are possible and that especially small workpieces may be cut by the cutting tool means without requiring large adjusting movements. It is also possible to arrange the respective rest position of the cutting tool means at a considerable distance from the working position so as to obtain large freedom of movement for the cutting tool means. The programming and the operation of such cutting tool means in the combined punching and cutting press is in this way considerably simplified.

An especially simple construction leading to a simple control is derived when a separate slide is used for each upper cutting knife and for the die for each cutting tool means mounted on the support means or the machine frame movable in the respective direction and such slides require only simple means for moving the same in the respective direction between the rest and the working position. Such moving means may, for instance, be constituted by fluid-operated cylinder-and-piston means connected to the respective slide.

Preferably, this arrangement includes also arresting means for each slide for arresting the same in either of the positions thereof. Such arresting means can be very exactly coordinated with the slide and be operated in a simple manner so that an exact position of the slides in the respective desired position will be assured. Preferably, the arresting means for each slide comprise a pair of bores in the slides spaced in the direction of movement of the slides from each other, an arresting bolt mounted in the support means movable between an inactive and an arresting position engaged in one of the bores and means cooperating with the bolt for moving the same between the positions thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a vertical cross-section, at an enlarged scale, through the upper cutting knife and the die and pressure pads to opposite sides of the cutting knife;

FIG. 6a and FIG. 6b respectively show one of the cutting tools in rest and the other in its working position.

DESCRIPTION OF THE PREFERRED EMBODIMENTS

Figure 1:
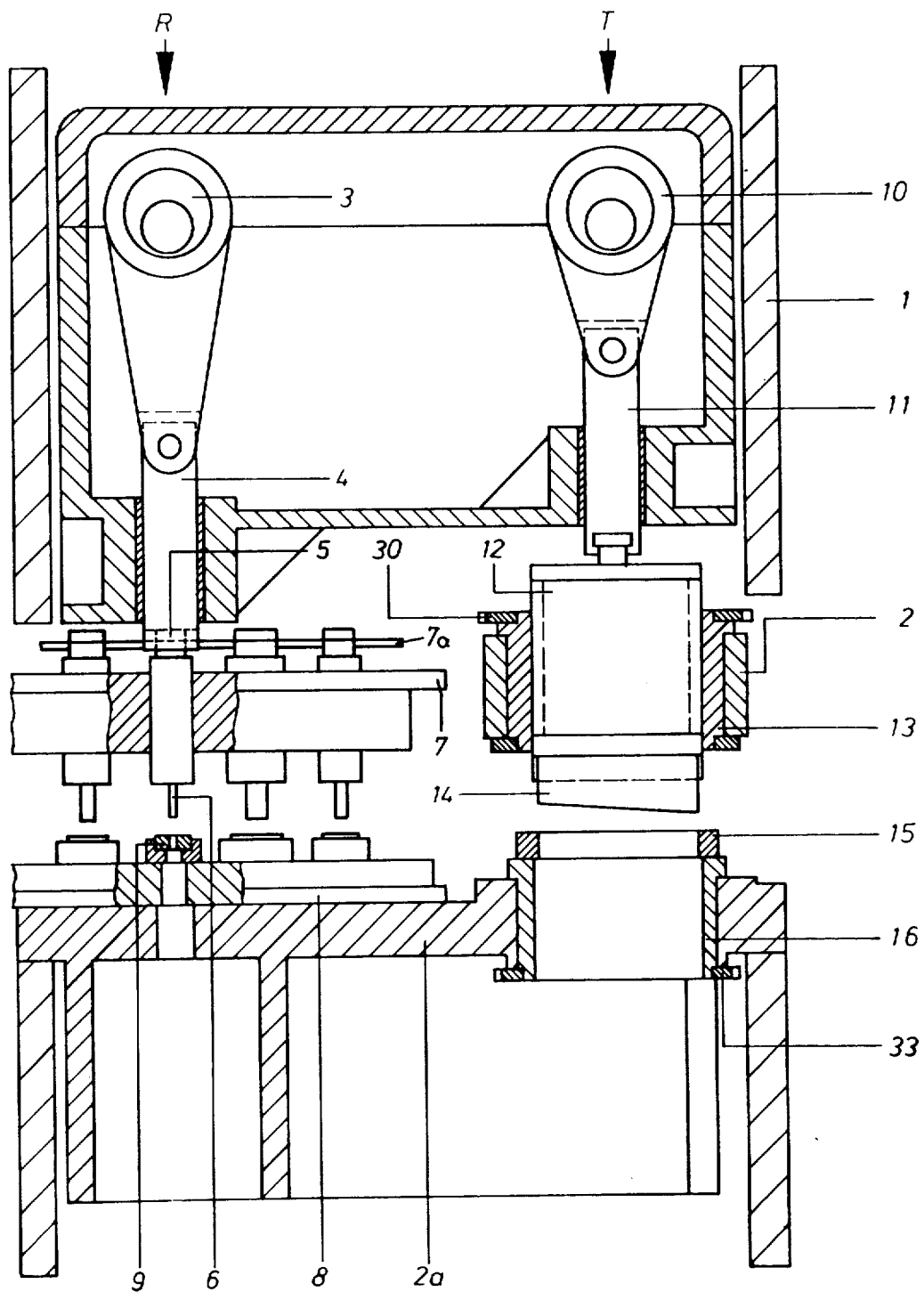
FIG. 1 is a longitudinal vertical cross-section through the punching and cutting tools of a combined punching and cutting press according to the present invention.
Figure 2:
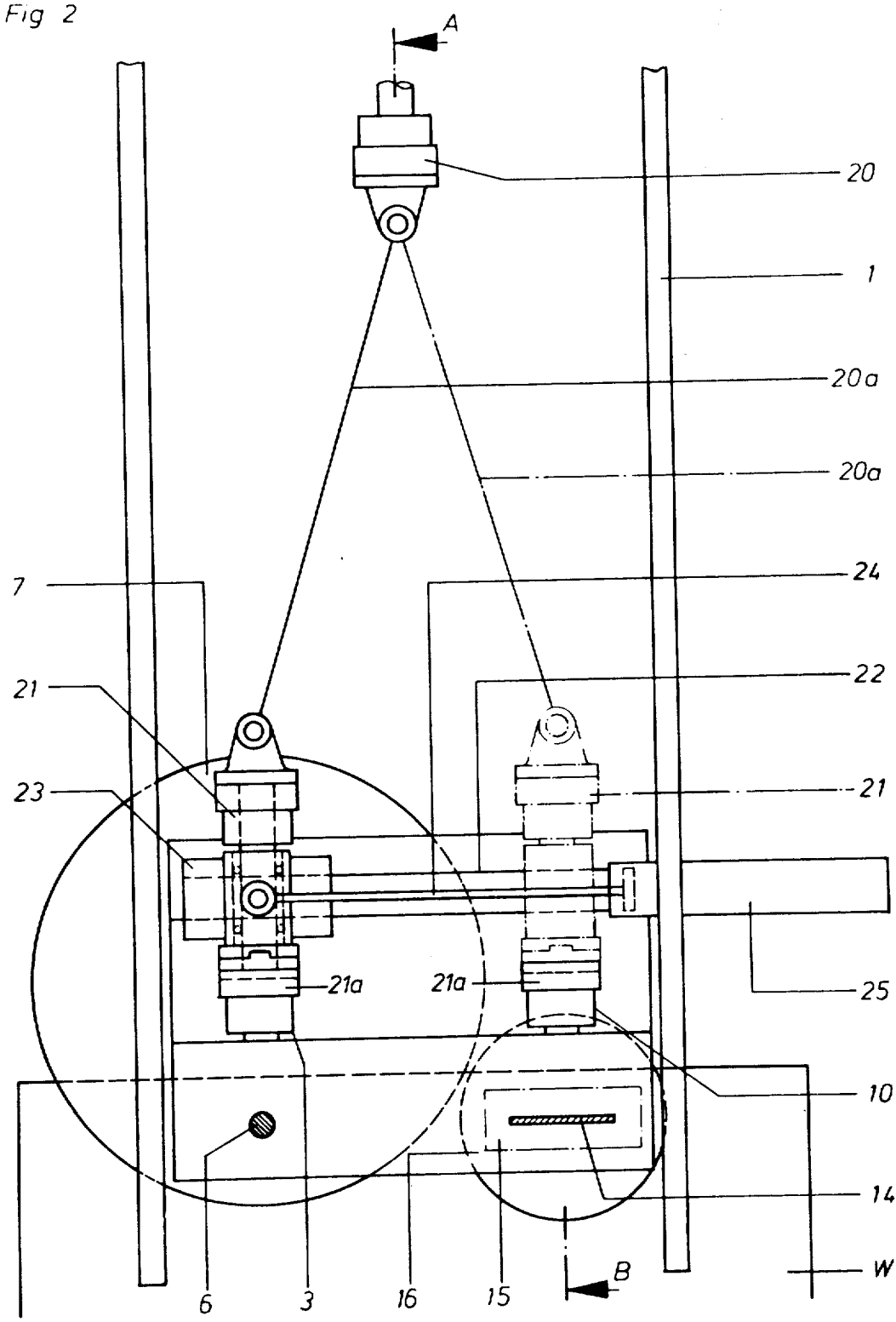
FIG. 2 is a schematic top view of the press according to the present invention.
Figure 3:
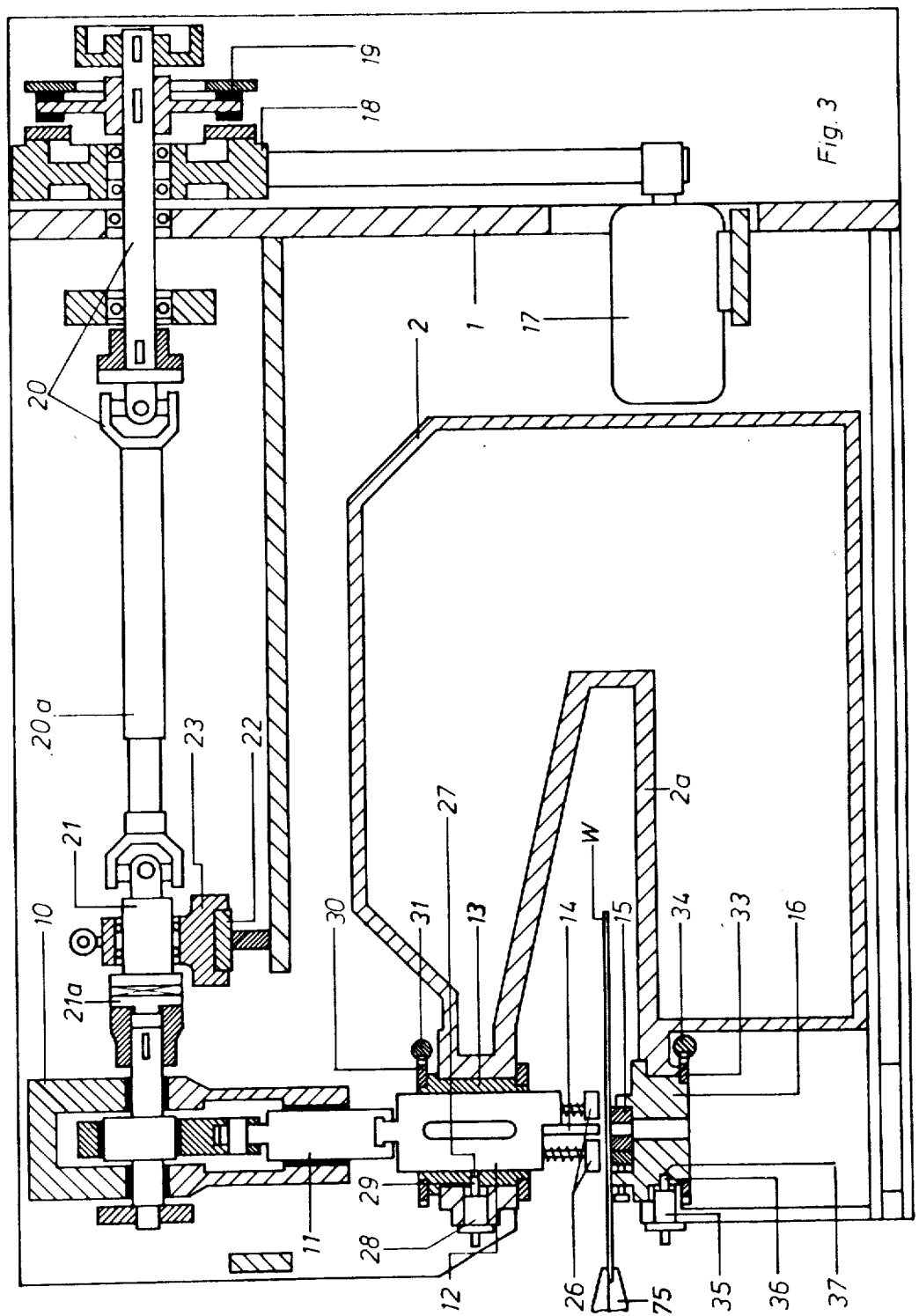
FIG. 3 is a cross-section taken along the line A-B of FIG. 2.

Referring now to the drawing, and more specifically to FIGS. 1-5 of the same, it will be seen that the combined punching and cutting press according to the present invention comprises support means or a machine frame having an outer portion 1 and an inner portion 2 which, as shown in FIG. 3, is substantially of C-shaped construction and which at its lower leg 2a forms a machine table, whereas the upper leg carries part of the drive and tools in the manner as will be described later on. As shown in FIGS. 1 and 2, the reciprocating means and the tool parts of the punching means, preferably constructed as a turret punch press, designated with the reference letter R, as well as the reciprocating means of the cutting tool means, designated with the reference letter T, are arranged adjacent each other on the common outer frame part 1.

The means for reciprocating the punching tool comprise an eccentric drive 3 connected at its lower end to a plunger 4, which in turn is connected at its lower end to a tool holder 5, which carries at its lower end a punching tool 6. The tool holder 5 is preferably releasably carried by the lower end of the plunger 4 and mounted for reciprocation in an indexable, schematically illustrated dial plate or turntable 7 of known construction, which may carry, as shown in FIG. 1, circumferentially spaced from each other, a plurality of tool holders and punching tools of different size which, during indexing of the turntable 7 may selectively be brought into engagement with the plunger 4. On the lower part 2a of the machine frame 2 is the lower dial plate or turntable 8 arranged, which may also carry a plurality of dies 9 of different size or outline circumferentially spaced from each other, so that during indexing of the lower dial plate 8 dies may be aligned with the respective punch connected to the plunger 4. The tool holders 5 on the upper turntable 7 are suspended in position ready for coupling with the lower end of the plunger 4 by hanging on the circumference of a stationary holding disc 7a, which is provided with an enlarged opening aligned with the plunger 4, so that when the enlarged upper end of the respective tool holder 5, during indexing of the turntable 7 engages in a coupling slot at the lower end of the plunger 4, the coupled tool holder may be reciprocated by the plunger.

The reciprocating means for the cutting tool means T comprises likewise an eccentric drive 10. This eccentric drive 10 transmits its movement over a plunger 11 to the cutter holder 12 guided for reciprocation in a guide bushing 13 which, in the manner as will be described later on, is turnably mounted about the axis of the plunger 11 and arrestable in any desired turned position in the machine frame 2. The cutter holder 12 carries at its lower end the upper cutting knife 14, which is constructed as a slitting knife. The lower leg 2a of the inner machine frame 2 carries the lower cutting knife which, as will be described later on, is constructed as a slot-shaped die 15 for cooperation with the upper slitting knife. The die 15 is mounted on the upper end of a die holder 16, which in turn is mounted at the leg 2a of the inner machine frame 2, in a manner as will be described later on, turnable about its axis and arrestable in a plurality of selected turned positions.

The main drive of the combined punching and cutting press comprises a drive motor 17 mounted on the outer machine frame 1, as shown in FIG. 3. Rotation of the output shaft of the drive motor 17 is transmitted over a belt drive to a flywheel 18 and from the latter over a, for instance pneumatically actuated, coupling 19 onto a cardan shaft 20 turnably mounted in the outer machine frame 1. The schematically illustrated coupling 19 is preferably a one-revolution clutch, which when actuated turns the cardan shaft during one revolution and is arrested in a position in which the punching tool and the cutting knife are held in the uppermost position that is out of engagement with the corresponding die. The cardan shaft 20 has a telescoping portion 20a and a coupling shaft 21 is connected to the end of the cardan shaft facing the eccentric drives 3 and 10. This coupling shaft 21, with the portion 20a of the cardan shaft is, as schematically shown in FIG. 2, by means of a tilting drive, to be described later on, tiltable for selectively coupling the same respectively with the eccentric drives 3 or 10. FIG. 2 illustrates the coupling connection between the cardan shaft 20, 20a and the eccentric drive 3 over the coupling shaft 21 in full lines and in dash-dotted lines the other coupling position between cardan shaft and the eccentric drive 10 of the cutting tool means T.

As shown in FIG. 2, the coupling shaft 21 is mounted on a carrier 23, which for instance may be constructed as a slide and which in turn is movable transverse to the longitudinal axis of the press on a guide 22. The piston rod 24 of a cylinder-and-piston unit 25 is tiltably connected at its free end to the carrier 23, so that the latter may be moved to either of the two end positions shown in FIG. 2 by feeding pressure fluid respectively to opposite sides of the piston of the cylinder-and-piston unit 25.

The cardan shaft 20, 20a, driven by the main drive 17 of the press, can thus by means of the coupling shaft 21 with its tilting arrangement 23, 24 and 25, be selectively coupled with the eccentric drive 3 or 10 of the punching tool means R and the cutting tool means T.

Figure 4:
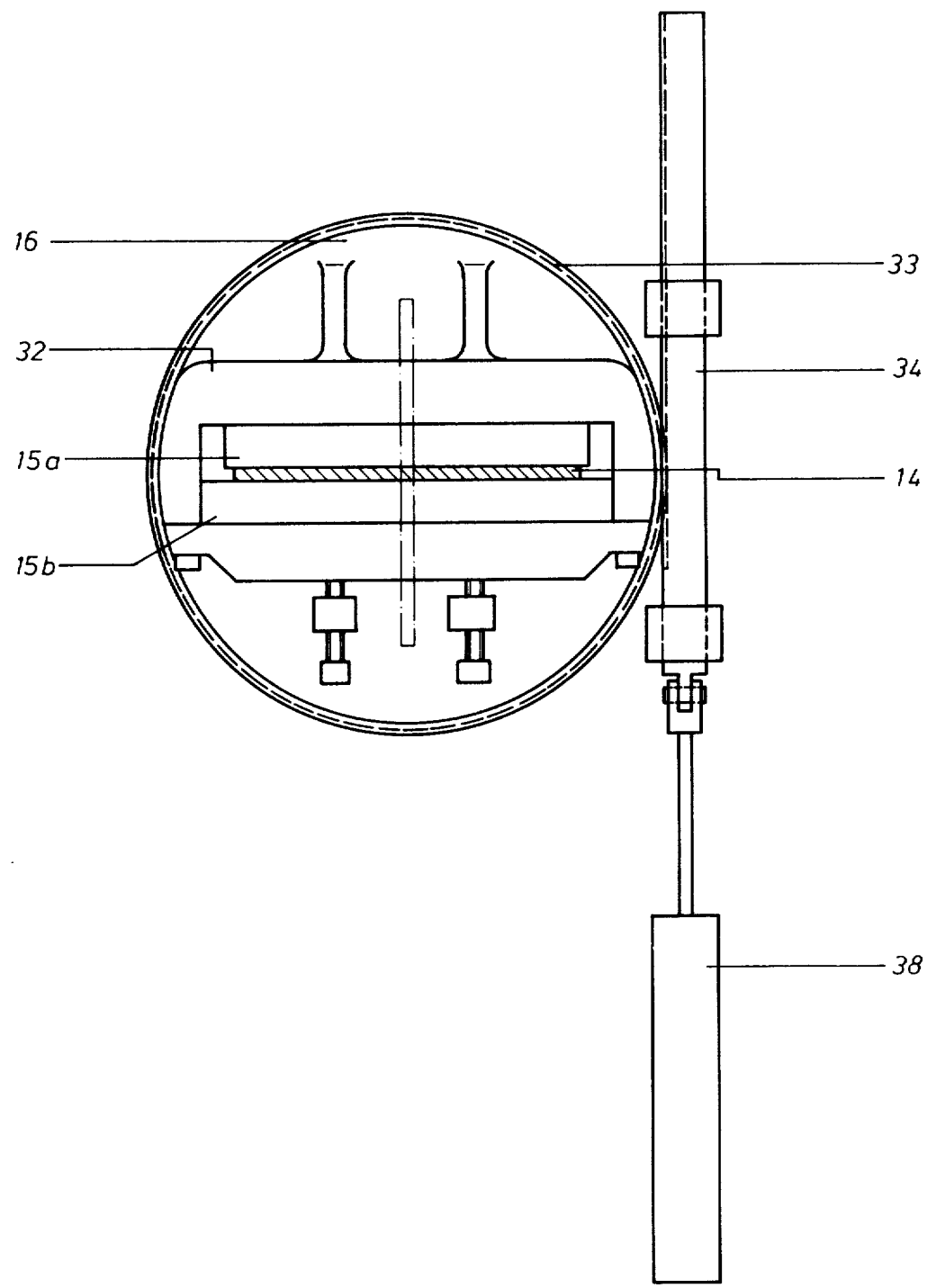
FIG. 4 is a top view, shown at enlarged scale, of the lower cutting knife in form of a die and elements cooperating therewith for turning the die.

FIGS. 3–5 illustrate further construction features of the cutting tool means according to the present invention. Referring first to FIGS. 3 and 4, it will be seen that the cutting knife holder 12 carries, at opposite sides of the slitting knife 14, spring-loaded pressure pads 26. In order to turn the cutting knife holder 12 and therewith the slitting knife 14 about the axis of the plunger 11 turning means are connected to the bushing 13, in which the tool holder 12 is mounted for reciprocation, and these turning means may, for instance, comprise an annular gear 30 fixed to the upper end of the bushing 13 for rotation therewith and a rack 31 meshing with the annular gear 30 and reciprocable in longitudinal direction. The bushing 13 may be arrested in one of a plurality of selected turned positions by electrically or fluid-operated arresting means 28 having an arresting bolt 29. The bushing 13 is provided with a plurality of circumferentially spaced arresting bores 27, in a respective one of which the arresting bolt 29 may penetrate to thus arrest the bushing 13 and therewith the knife holder 12 and the slitting knife 14 in a desired turning position. By actuating the arresting device 28, the arresting bolt 29 may be drawn out of the corresponding bore and the knife holder 12 be turned to another desired angular position.

As further shown in FIGS. 3 and 4, the cutting edges of the slot shaped die 15 are provided on a pair of cutting bars 15a and 15b which are clamped in a cassette 32. The cassette 32, in turn, is carried by the die holder 16 turnably mounted in the lower leg 2a of the inner portion 2 of the machine frame. Turning means are also provided for turning the die holder 16 and therewith the die 15 mounted thereon in synchronism with the turning of the slitting knife 14 and the turning means may likewise comprise an annular gear 33 connected to the lower end of the die holder 16 for turning movement therewith and a rack 34 meshing with the annular gear 33. To arrest the die holder 16 and therewith the die 15 mounted thereon in a respective selected turned position corresponding to the turned position of the slitting knife 14 there is again provided an electrically or fluid-operated arresting means 35 with an arresting bolt 36 coordinated with a plurality of arresting bores 37 provided circumferentially spaced from each other on the peripheral surface of the die holder 16.

The racks 31 and 34 may together be moved in longitudinal direction, to thereby turn the guide bushings 13 and the die holder 16 through equal angles, for instance by a fluid-operated cylinder-and-piston unit 38 connected to both of the aforementioned racks. It is to be understood that also different drives may be provided to turn the guide bushings 13 for the knife holder 12 and the die holder 16 synchronously through equal angles.

FIG. 3 also shows a clamp 75 for holding the workpiece W between the lower end of the knife 14 and the upper end of the die 15. Movement of the clamp 75 may be automatically controlled by means known in the art for positioning the workpiece during the punching and the subsequent cutting operation.

FIG. 5 illustrates further features of the cutting tool means T. As shown in FIG. 5, one of the pressure pads 26 is provided on its face thereof directed toward the slitting knife 14 with a knife guide 39. The same pressure pad 26, that is the left pressure pad, as viewed in FIG. 5, carries further in bores thereof two parallel, spring biased pilot pins 40 spaced from each other in the longitudinal direction of the slot in the die 15, of which only the front pin is shown in the drawing, and these pins project with the ends thereof beyond the face of the pressure pad 26 which is directed toward the die to penetrate during downward movement of the knife holder 12 and corresponding downward movement of the slitting knife 14 and the pressure pad 26 into corresponding pilot bores 41 provided in the die 15. As shown in FIG. 5, the lower ends of the pilot pins 40 project beyond the lower end of the slitting knife 14 so that the pilot pins 40 will penetrate into the pilot bores 41 before the lower end of the slitting knife 14 engages a workpiece resting on the upper surface of the die 15. The pilot pins 40 in cooperation with the knife guide 39 will prevent that the slitting knife, during cutting of the workpiece only with one of the cutting edges thereof, will be laterally displaced.

By suitable electric safety mechanism, known in the art, the mutual position of the slitting knife 14 and the die 15 for cooperation with each other may be assured, especially that the cutting operation can be started only when the slitting knife 14 and the die 15 have the same angular position.

Figure 7:
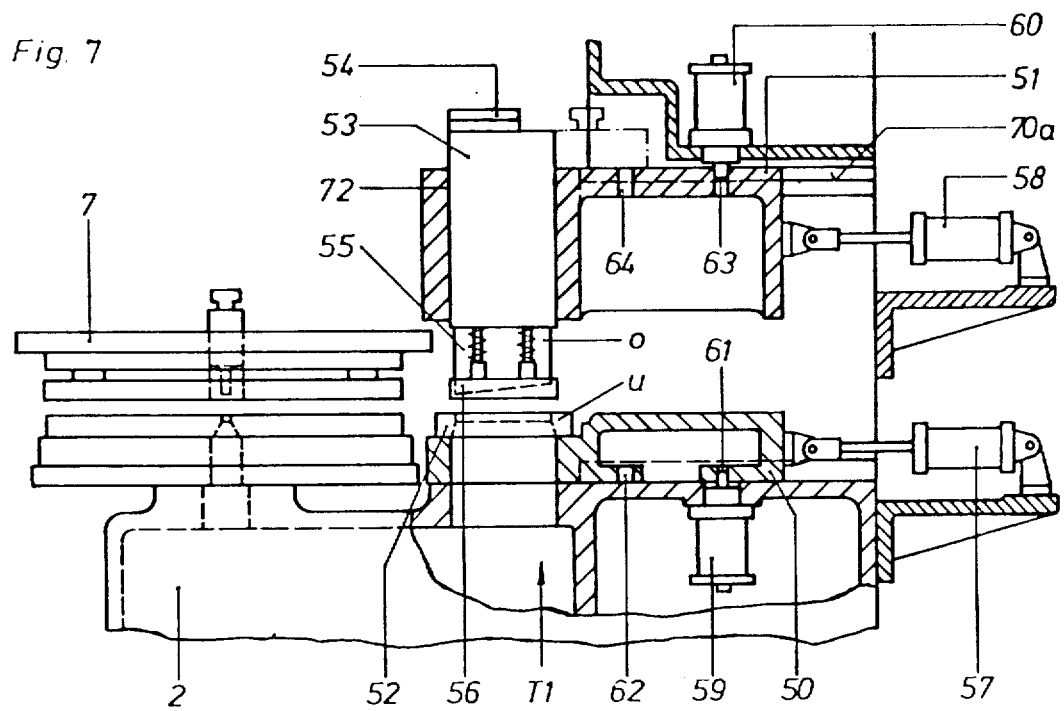
FIG. 7 is a partial sectioned side view of the embodiment shown in FIG. 6, with the section taken along line VII—VII of FIG. 6.
Figure 6:
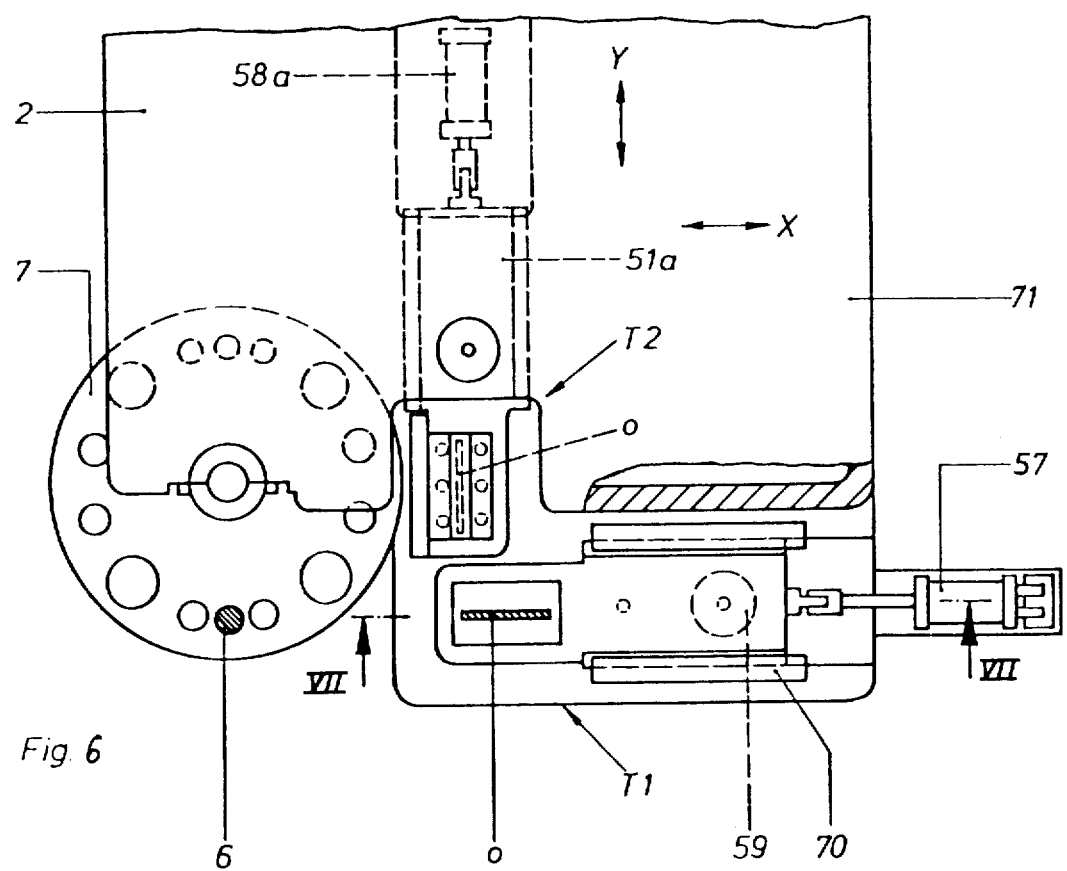
FIG. 6 is a partially sectioned top view of a second embodiment of the combined punching and cutting press according to the present invention showing two cutting tools movable between a rest and a working position.

Reference is now had to FIGS. 6 and 7 which illustrate a second embodiment of a combined punching and cutting press according to the present invention. On the inner machine frame 2 there is again provided the turntable 7 of a turret punch press and at 6 one of the punching tools is shown in the working position on the turntable 7. It is to be understood that the punching tools 6 are constructed and reciprocated in the manner as described in connection with the embodiment shown in FIGS. 1-5, and that this part of the combined press includes also a lower turntable which carries the plurality of corresponding dies for cooperation with a respective one of punching tools 6.

The elements of the cutting tool means of the combined punching and cutting press are also arranged on the inner machine frame 2, as shown at the right side of FIGS. 6 and 7. In this embodiment two cutting tool means are provided generally designated with T1 and T2 and each including an upper cutting knife O and a lower cutting knife or die U. In FIG. 6, only the upper cutting knife O of the cutting tool means T2 are illustrated. FIG. 7 illustrates the cutting tool means T1 in a vertical cross-section with the upper cutting knife O and the lower cutting knife or die U.

The upper and the lower cutting knives of the two cutting tool means T1 and T2 are respectively selectively movable in two directions normal to each other and in a plane normal to the direction of reciprocation of the upper cutting knives from a rest position to a working position in which the respective upper and lower cutting knives are aligned with each other for cooperation.

The construction of one of the two cutting tool means provided in the modification illustrated in FIGS. 6 and 7 will now be described in further detail, that is the construction of the cutting tool means T1 which are usually movable in the direction X as shown in FIG. 6. The cutting tool means T2 are correspondingly constructed.

As seen in FIG. 7, the lower cutting knife or die 52 of the cutting tool means T1 is mounted on a slide 50 which in turn is slidably mounted on the lower leg 71 of the inner C-shaped body of the machine frame 2. The slide 50 is guided on guide rails 70 and movable by means of a for instance pneumatically operated cylinder-and-piston unit 57 from a rest position to a working position shown in FIGS. 6 and 7. The upper knife O is formed by the slitting knife 55 which is fixedly connected to the knife holder 53. Spring pressed pressure pads 56 are again connected to the knife holder 53, projecting in the extended position beyond the cutting edge of the slitting knife 55. The knife holder 53 is arranged in a slide 51 which is slidably mounted in the upper leg of the C-shaped inner frame body. The slide 51 is guided on guide rails 70a. The slide 51 is movable on the guide rail 70a from a rest position to a working position, shown in FIG. 7, by a pneumatically operated cylinder-and-piston unit 58. The slide 51 and the knife holder 53 with the slitting knife 55 are shown in the drawing in a working position aligned with the working position of the slide 50 carrying the die 52. The knife holder 53 on the slide 51 can be coupled with a corresponding plunger driven by reciprocating means as described and illustrated in FIGS. 1-4. For this purpose the upper end of the knife holder 53 is provided with an elongated coupling portion 54 which engages, in the working position in a slot of a catching projection 77 at the lower end of the enlarged plunger 76, as schematically illustrated in dash-dotted lines in FIG. 6a. In FIG. 6b the coupling portion 54a of the knife holder 53a is shown connected to the catching projection 77 of the plunger.

The cutting tool means T2 are connected in a corresponding manner. In FIG. 6 only the slide 51a of the upper knife O is shown with its drive in form of a pneumatic cylinder-and-piston unit 58a. The upper knife O of the cutting tool means T2 are in a corresponding manner and selectively likewise connectable with the plunger of a common reciprocating means for both cutting tool means T1 and T2.

To arrest the slides 50 and 51 of the cutting tool means T1, and in a corresponding manner also the slides of the cutting tool means T2, arresting devices are provided which comprise each an arresting bolt mounted in the machine frame movable between an inactive and an arresting position and arresting bores cooperating therewith provided in the respective slide. As shown in FIG. 7, there is provided a solenoid or fluid-operated arresting bolt 59 for the lower slide 50 which, in the illustrated operating position of the lower slide, engages in the arresting bore 61 of the slide 50. Another arresting bore 62 is provided in the slide 50 for arresting the same in a rest position, moved towards the right from the position shown in FIG. 7. Correspondingly a driven arresting bolt 60 is engaged in the arresting bore 63 in the slide 51, likewise shown in working position in FIG. 7. Another bore 64 is provided in the slide 51 for the rest position of this slide. These arresting arrangements will prevent any inadvertent movement of the slides 50 and 51.

If in accordance with the illustration in FIGS. 6 and 7, the cutting tool means T1 are to be moved to their working position, then the two slides 50 and 51 are simultaneously moved by the cylinder-and-piston units 57 and 58 into the illustrated working positions in which the arresting bolts 59 and 60 are respectively engaged in the bores 61 and 63. After the cutting operation in this cutting plane is finished, the arresting bolts are withdrawn and the slides 50 and 51 are drawn back so far until the arresting bolts 59 and 60 will enter into the bores 62 and 64, respectively.

The cutting tool means T2 which are shown in FIG. 6 displace through 90° with respect to the cutting tool means T1, are constructed and operated in a similar manner.

The alternating use of the two cutting tool means T1 and T2 proceeds according to the machine program and may be automatically controlled by numerical control means of the combined punching and cutting press. The cutting tool means T1 and T2 are respectively movable between a rest and a working position in the two directions x and y normal to each other which corresponds to the usual coordinate operating manner of such machines. As can be further visualized from the drawing, the cutting tool means T1 in the working position can be arranged relatively close to the punching tool on the turntable 7. It is further possible to withdraw the cutting tool means T2 in the rest position up to the center of the turntable.

It will be understood that each of the elements described above, or two or more together, may also find a useful application in other types of combined punching and cutting presses differing from the types described above.

While the invention has been illustrated and described as embodied in a combined punching and cutting press in which the main drive of the press may be selectively coupled to the punching tools and the cutting tools of the press, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A combined press for punching and cutting plate-shaped workpieces, especially workpieces of sheet metal, comprising support means; at least one punching tool means mounted on said support means and including a punch reciprocable along an axis; first means operatively connected to said punch for reciprocating the same along said axis; cutting tool means mounted on said support means and including at least one knife reciprocable in a plane parallel to said axis; second means operatively connected to said knife for reciprocating the same in said plane, each of said first and second reciprocating means comprising a plunger guided in said support means for reciprocating movement and eccentric drive means connected to one end of said plunger, said punch and knife being connected to the other end of the respective plunger; main drive means; and transmission means connected to said main drive means and selectively connectable to said first and second reciprocating means to reciprocate either said punch or said cutting knife, said transmission means comprising a cardan shaft connected at one end to said main drive means and a coupling shaft connected to the other end of said cardan shaft, and means cooperating with said coupling shaft for moving the latter selectively between two positions for respectively coupling said coupling shaft to the eccentric drive means of either said first or said second reciprocating means.

2. A press as defined in claim 1, wherein said means cooperating with said coupling shaft comprise a carrier carrying said coupling shaft, guide means for guiding said carrier along a predetermined path, and means for moving said carrier along said predetermined path so as to place said coupling shaft into positions for coupling the same with said eccentric drive means of either said first or said second reciprocating means.

3. A press as defined in claim 2, wherein said means for moving said carrier along said predetermined path comprises fluid operated cylinder-and-piston means.

4. A press as defined in claim 2, wherein said reciprocatable cutting knife is an upper cutting knife connected to the other end of the respective plunger turnable about the axis of the latter, said cutting tool means including at least one lower cutting knife and means mounting said lower cutting knife in said support means turnable about the axis of the respective plunger, and means for arresting said upper cutting knife and said mounting means in a selected one of a plurality of turned positions in which said upper cutting knife and said mounting means are turned through equal angles.

5. A press as defined in claim 4, wherein said upper cutting knife is constructed as a slitting knife having a pair of parallel cutting edges and including a tool holder connected at one end to the other end of the respective plunger turnable about said axis and reciprocatable along said axis, said tool holder carries said slitting knife at the other end thereof, and a pair of pressure pads carried by said other end of said tool holder to opposite sides of said slitting knife, wherein said lower cutting knife is constituted by a die having a pair of parallel cutting edges arranged for cooperation with said cutting edges of said slitting knife; means mounting said die in said support means turnable about said axis, arresting means cooperating with said tool holder and said mounting means of said die for arresting said tool holder and said mounting means in a selected one of turned positions in which said cutting edges of said slitting knife and those of the die are substantially aligned with each other.

6. A press as defined in claim 5, and including means cooperating with said tool holder of said slitting knife and said mounting means of the die for turning said slitting knife and said die through equal angles.

7. A press as defined in claim 6, and
including a guide bushing mounted in said support means turnable about said axis and carrying said tool holder for turning movement therewith and for reciprocation along said axis, said turning means being connected to said guide bushing and said mounting means of the die for turning said guide bushing and said mounting means through equal angles about said axis.

8. A press as defined in claim 7, wherein
said turning means comprises a pair of annular gears respectively coaxially fixed to said guide bushing and said mounting means, a pair of racks respectively meshing with said pair of annular gears, and means connected to said pair of racks for moving the same through equal distances.

9. A press as defined in claim 7, wherein said arresting means comprise a pair of arresting bolts respectively coordinated with said guide bushing and said mounting means of said die, a plurality of circumferentially spaced arresting bores in said guide bushing and said die, and means connected to said arresting bolts for moving the same between an inactive position and an arresting position engaged in a respective arresting bore.

10. A press as defined in claim 5, and including a slitting knife guide carried by at least one of said pressure pads at the side thereof facing said slitting knife, and at least two pilot pins spaced in the direction of the plane of said slitting knife carried by said one pressure pad and projecting towards the die and corresponding pilot bores in said die for receiving said pilot pins.

11. A press as defined in claim 10, and including means for yieldably biasing said pilot pins to project beyond said face of said pressure pad which is directed towards said die.

12. A press as defined in claim 5, wherein said pair of cutting edges of said die are provided on a pair of cutting bars, and including means on said mounting means of said die for clamping said cutting bars thereon with said cutting edges extending spaced and parallel to each other.

13. A combined press for punching and cutting plate-shaped workpieces, especially workpieces of sheet metal, comprising support means; at least one punching tool means mounted on said support means and including a punch reciprocable along an axis; first means operatively connected to said punch for reciprocating the same along said axis; two cutting tool means mounted on said support each including an upper cutting knife reciprocable in a respective plane parallel to said axis and a lower cutting die arranged for cooperation with a respective upper cutting knife, said two cutting tool means being movable relative to each other in a plane normal to said axis and selectively in two directions which are normal to each other between a rest position and a working position; second means for reciprocating said upper cutting knives, said second reciprocating means being constructed for coupling the upper cutting knife of each of said cutting tool means in said working position for reciprocation; main drive means; and transmission means connected to said main drive means and selectively connectable to said first and second reciprocating means to reciprocate either said punch or that upper cutting knive which is in said working position.

14. A press as defined in claim 13, and including a separate slide for the upper cutting knife and for the die of each cutting tool means mounted on said support means movable in the respective direction and means connecting to each slide for moving the same in the respective direction between a first position corresponding to the rest position of the respective cutting tool means and a second position corresponding to said working position of the respective cutting tool means.

15. A press as defined in claim 14, and including arresting means for each slide for arresting the same in either of the positions thereof.

16. A press as defined in claim 15, wherein said arresting means for each slide comprise a pair of bores in said slides spaced in the direction of movement of the slides from each other, an arresting bolt mounted on said support means movable between an inactive and an arresting position engaged in one of said bores, and means cooperating with said bolt for moving the same between the positions thereof.

* * * * *